United States Patent

Simpson

[15] 3,677,064
[45] July 18, 1972

[54] APPARATUS FOR AUTOMATIC CRYSTAL POINT DETECTION

[72] Inventor: Samuel W. Simpson, Florissant, Mo.
[73] Assignee: Shell Oil Company, New York, N.Y.
[22] Filed: May 13, 1970
[21] Appl. No.: 36,836

[52] U.S. Cl. .........................................................73/17 R
[51] Int. Cl. .......................................................G01n 25/02
[58] Field of Search......................................................73/17

[56] References Cited

UNITED STATES PATENTS

| | | | |
|---|---|---|---|
| 3,436,956 | 4/1969 | Fleming | 73/17 |
| 3,496,760 | 2/1970 | Puzniak | 73/17 |
| 2,635,455 | 4/1953 | Staehling | 73/17 |
| 2,658,383 | 11/1953 | Thipley | 73/17 |

FOREIGN PATENTS OR APPLICATIONS 1,176,907  1/1970  Great Britain............................73/17

*Primary Examiner*—Richard C. Queisser
*Assistant Examiner*—Herbert Goldstein
*Attorney*—J. H. McCarthy and Harold L. Denkler

[57] ABSTRACT

An apparatus for determining the crystal point of a sample of a normally liquid composition having constituents which crystallize upon being cooled by disposing the sample in a container and extending a temperature measuring device into contact with the sample. The sample is cooled while recording the change in temperature thereof on a cooling curve. The temperature of the sample is measured while detecting any changes in the slope of the cooling curve of the sample and the point on the cooling curve when the slope thereof approaches zero is recorded.

1 Claim, 1 Drawing Figure

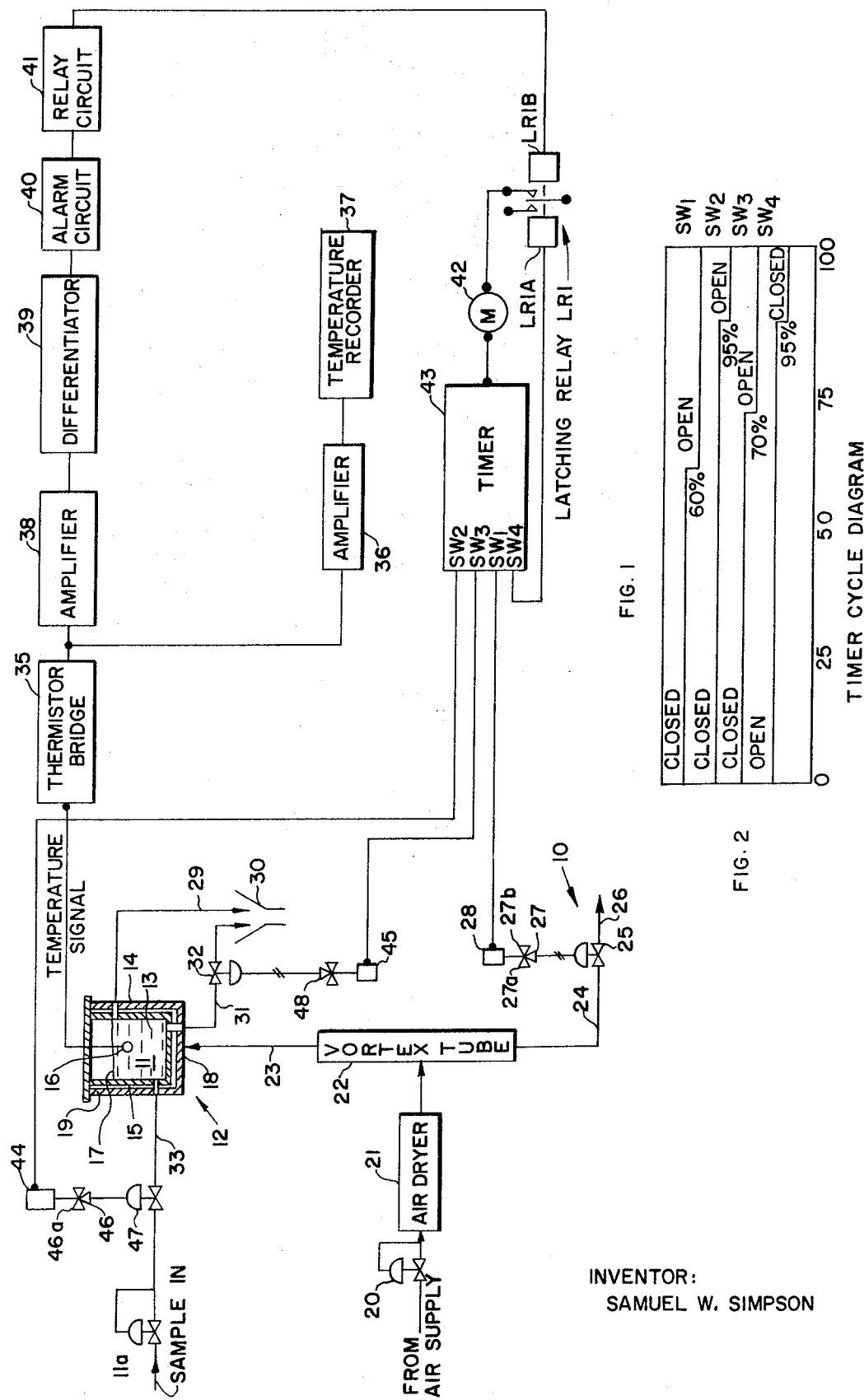

APPARATUS FOR AUTOMATIC CRYSTAL POINT DETECTION

BACKGROUND OF THE INVENTION

1. Field of the Invention

The invention relates to a technique for detecting the crystal point of a liquid composition having constituents which crystallize upon cooling; and, more particularly, it relates to an apparatus utilizing the change in the slope of the cooling curve of the composition when it is cooled to determine the crystal point of the composition.

2. Description of the Prior Art

The apparatus described herein is suitable for use with any liquid composition which contains solidified constituents when cooled. However, it is particularly applicable to oils, including synthetic lubricating oils, mineral hydrocarbon oils, and fuel oils, since the pour and cloud points of these oils is an important aspect of quality evaluation in the oil industry.

When liquid petroleum products are cooled, a point is reached at which some of the constituents begin to solidify; and if cooling is continued, the oil eventually ceases to flow. The ASTM Cloud Point is defined as the temperature when visual inspection first reveals a distinct cloudiness or haze in the oil at the bottom of the test jar. Accordingly, the ASTM Cloud Point Test which is standard in the industry is intended for use only on oils which are transparent in layers, 1½ inch in thickness. The conventional method of determining cloud point of a liquid composition requires the liquid to be first warmed to a temperature of at least 25° F above the approximate cloud point. At this temperature, moisture, if present, is removed by any suitable method. The sample is then poured into a test jar of prescribed size, and a thermometer is placed in the sample in a vertical position in the center of the jar with the thermometer resting on the bottom of the jar. Next, the test jar and sample are placed in a jacket. Then the test jar and jacket are placed in a cooling bath, and the sample is cooled at a specified rate. At each test thermometer reading that is a multiple of 2° F, the test jar is removed from the jacket quickly without disturbing the oil. The oil is visually inspected for cloud and replaced in the jacket. This complete operation should require not more than 3 seconds. When such inspection first reveals a distinct cloudiness or haze in the oil at the bottom of the test jar, the reading of the test thermometer is recorded as the cloud point. In modern-day practice in oil refineries, hundreds of such cloud point tests are carried out more or less manually and require the constant presence of an Operator whose judgment and skill are relied upon for a determination of the cloud points. Manipulations are generally made by hand; and there is a high variance from sample to sample and from Operator to Operator so that for any particular oil under test, the results obtained by several Operators may vary as much as 8° F.

In my copending application Ser. No. 700,198, filed Jan. 24, 1968, now U.S. Pat. No. 3,514,993 dated June 2, 1970, I disclosed apparatus and a method for detecting the crystal point of a normally liquid composition having constituents which crystallize upon being cooled by placing a sample in a container which contains a point source measuring device. A pair of thermistors forming opposite legs of a Wheatstone bridge normally balanced when they are at the same temperature are disposed in the sample. One of the thermistors is on substantially the same horizontal plane as the measuring device; the other is disposed a short distance above. As the sample is cooled from the bottom up, the bridge is unbalanced. Crystals begin to form on the measuring device, the latent heat given off from the crystals heats the lowermost thermistor and rebalances the bridge, thereby indicating the crystal point of the sample.

However, in the process of my copending application, it has been found that the analyzers used present recurring problems with conventional mechanical refrigeration because seasonable ambient temperature fluctuations make it difficult to maintain a constant cold sink temperature with every cooling cycle. A constant cold sink is required to give a repeatable time-temperature cooling curve and at the same time permit a noticeable change in the cooling curve when the crystal point or change of state of the sample is reached. Further, each analyzer of my copending application uses three thermistors in making the temperature measurement and detecting a noticeable change in the slope of the cooling curve. This makes positioning of the thermistors within the sample critical and the whole assembly bulky.

SUMMARY OF THE INVENTION

It is an object of this invention to provide an improved and more efficient apparatus for determining the crystal point of a liquid composition having constituents which crystallize upon being cooled, such as fuel oils.

It is a further object of this invention to provide an improved method and apparatus for determining the crystal points of such compositions utilizing only a single temperature measuring device.

It is a still further object of this invention to determine the crystal point of such compositions without the need for precisely positioning a temperature measuring device in a sample of the liquid composition thus improving the reliability of the system.

It is an even further object of this invention to provide an apparatus for determining the crystal point of such liquid compositions without the necessity for cumbersome sensing devices.

These and other objects are preferably accomplished by disposing a sample of the liquid composition in a container and extending a temperature measuring device into contact with the sample. The sample is cooled while recording the change in temperature thereof on a cooling curve. The temperature of the sample is measured while detecting any changes in the slope of the cooling curve of the sample and the point on the cooling curve when the slope thereof approaches zero is recorded.

This zero point on the cooling curve may then be used to cycle the crystal point analyzing system. The cloud or crystal point of an oil sample correlates directly with the ASTM (American Society of Testing and Materials) cloud point. The crystal point derived at by the preferred method and apparatus of this invention has been found to be a most accurate tool for predicting the low-temperature characteristics of fuel oils.

BRIEF DESCRIPTION OF THE DRAWING

The drawing is a schematic illustration for carrying out the system of my invention.

DESCRIPTION OF THE PREFERRED EMBODIMENT

Referring to the drawing, an analyzing system 10 is shown when a sample 11 is disposed in a suitable sample cell 12, such as a glass cup 13. The cup 13 is preferably insulated, as, for example, by supporting the cup 13 in a polyurethane foam jacket 14 so that a small annular space 15 exists between the walls of the cup 13 and the bottom thereof and the sides and bottom of the jacket 14. The sample 11 can be any liquid component having solidified constituents when cooled; as for example, fuel oils, such as kerosene, range fuel and gas oils, furnace oils, etc. A point source temperature measuring device, such as thermocouple or thermistor which is a small solid state semiconductor having a negative coefficient of resistivity is used to sense temperature by measurement of resistance.

An inlet 18 is provided at preferably the bottom of cell 12 for introducing cold air into the bottom of jacket 14 where it is equally distributed around cell 12 and vents to atmosphere as at vent 19 located preferably at substantially the top of jacket 14. Air is supplied from an external source (not shown) through a suitable pressure-operated control valve 20 and into a conventional air dryer, as for example, a mechanically refrigerated dryer 21. From dryer 21, the dried cool (+35°

−+40° F) air is passed to a conventional vortex tube 22 where the dried compressed air is converted into hot and cold air. From tube 22, the cooled air passes through an air inlet pipe 23 coupled to both tube 22 and inlet 18. The hot air from vortex tube 22 passes through hot air exhaust pipe 24, through a suitable normally open pressure-operated control valve 25, and to a hot air exhaust 26. Controlling air may be introduced to valve 25 from an external air source (not shown) through air inlet 27a past valve 27 or vented 27b, which is automatically controlled by timer switch 28 as will be explained further hereinbelow.

Overflow from cell 12 is drawn off by means of an overflow outlet pipe 29 operatively engaging both the interior of cell 12 and a drain 30. A drain outlet pipe 31 operatively engages both the interior of cell 12, at substantially the bottom thereof, and drain 30, for draining sample 11 from cell 12. Pipe 31 is controlled by means of a normally closed pressure controlled valve 32.

The sample 11 may be introduced from an external source (not shown) past a fluid pressure reducer valve 11 and into cell 12 by any suitable means, as for example, a sample inlet pipe 33 which is controlled by a suitable pressure control valve 47 and forms part of a continuous sample loop (not shown) as is well known in the art.

Thermistor 16 forms the variable resistance leg of a Wheatstone resistance bridge 35 and the output thereof is supplied to a suitable amplifier 36 and temperature recorder 37 for recording the signal from bridge 35 as the temperature changes in sample 11 thereby changing the voltage across bridge 35. The recorder 37 is preferably any electronic recorder that converts the signal from the Wheatstone resistance bridge 35 to a temperature reading.

The output of bridge 35 is also supplied to amplifier 38, the derivative of the input signal thereof being taken by differentiator 39. An alarm circuit 40 indicates the zero point of the cooling curve and actuates relay circuit 41 which actuates latching relay LR-1 to actuate motor 42 which in turn actuates the cams (not shown) of timer 43 for operating solenoids 28, 44 and 45 through switches SW1, SW2, SW3 and SW4. It can be seen from the foregoing the solenoid 28 is coupled to both valve 27 and switch SW1. The solenoid 44 from switch SW2 of timer 43 is coupled to a like valve 46. Valve 46 is coupled to a pressure actuated valve 47 operatively engaging sample inlet pipe 33 for selectively introducing a sample from an external source (not shown) into pipe 33 as will be explained further hereinbelow.

In like manner, solenoid 45 from switch SW3 coupled to timer 43 is coupled to a valve 48 which is coupled to pressure actuated valve 32 for draining the sample cell 12 into drain outlet pipe 31.

In operation, a sample 11, as for example, a furnace oil, is deposited in cell 12 and a suitable quantity of air, as for example, 8 SCFM of 70 psig dry air, is introduced into dryer 21 where it is dried to a lower temperature, as for example, +40° F. From dryer 21, the dried cold air enters vortex tube 22, as for example, a Fulton Model 1061X vortex tube, manufactured by the Fulton Cryogenics Company of Cincinnati, Ohio. The air is cooled, as for example, to −50° F, and passed through inlet pipe 23 into cell 12 where the sample 11 is cooled. A stable cooling system having a constant cooling capacity may be obtained by maintaining a constant air supply pressure and temperature at vortex tube 22. Air pressures are readily regulated by means of a regulator control vale 20 coupled to dryer 21 for supplying air at a suitable temperature, as for example, +40° F, thus maintaining a constant inlet air temperature to vortex tube 22 regardless of ambient conditions.

The cold air from vortex tube 22 and inlet pipe 23 enters the bottom of jacket 14, is equally distributed around cell 12, and vents at vent 19 to the atmosphere. Because of the relatively small heat capacity of jacket 14, cell 21 reaches minimum temperature very shortly after the test begins. At the end of the test, the hot air exiting from vortex tube 22 through hot air exhaust pipe 24 is blocked, as by closing valve 25, thus permitting all the air to vent on the cooling side of tube 22, that is, nullifying the cooling process of the vortex tube 22 thus rapidly warming sample 11 with +40° F air. The annular space 15 goes to the same low temperature with each testing cycle as long as air supply pressure and temperature are kept constant thus producing a reproducible plateau in the cooling curve of the sample 11 under test as will be explained further hereinbelow.

The location of thermistor 16 in sample 11 is not critical; however, preferably thermistor 16 is located approximately in the center of sample 11. As discussed hereinabove, the thermistor 16 forms the variable resistance leg of Wheatstone bridge 35, which produces a voltage output proportional to the temperature of sample 11, measured by thermistor 16, and is connected to both recorder 37 and an operational differentiator circuit, represented by amplifier 38, differentiator 39, alarm card 40, and relay card 41. This circuit utilizes the first derivative of the cooling curve to cycle the analyzing system 10 when the slope of the cooling curve approaches zero. This occurs whenever a plateau is reached as a change of state takes place in sample 11. The circuit is stable and utilizes conventional printed circuit cards.

The sampling system 10 of FIG. 1 is preferably designed to handle oils in the range of kerosene and furnace oils. A heat exchanger (not shown) is used to precool a small slipstream loop of the hot light gas oil. The sample line 33 from the slipstream to sample cell 12 is very short. This guarantees a fresh sample to the sample cell 12 very soon after the sample valve 47 is opened. When the sample 47 is opened, the flow of sample is directed to the sample cell 12 for sufficient time to guarantee complete flushing and refilling. After the cell 12 is full, it overflows until the present timed sequence turns off sample valve 47.

In operation, a push-button starting switch (not shown) is closed, thereby starting the first cycle by energizing a latching relay coil LR-1B of latching relay LR-1.

This starts the timer 43 which requires a 90-second operating cycle for complete rotation of its cams (see FIG. 2). Timer switch SW-1 closes immediately for 60 percent of the cycle. This actuates the vortex tube hot air exhaust solenoid valve 28 which actuates valve 25 and allows the air at (+35° to +40° F) to warm up the sample cell 12. Timer switch SW-2 closes immediately after the cycle begins and stays closed for 95 percent of the cycle. This actuates sample inlet solenoid valve 44 which actuates valve 47 and allows the sample cell 12 to be flushed and refilled. Timer switch SW-3 closes immediately for 70 percent of the cycle. This actuates sample discharge solenoid valve 45 which actuates valve 32 and allows the old sample and new sample flush to be drained from cell 12. Timer switch SW-4 is closed at 95 percent of the cycle thus energizing latching relay LR-1A of latching relay LR-1 which by means of a time delay causes the timer to stop at a position whereby it can be restarted by a pulse from relay circuit 41.

Cooling with the type of coolant described hereinabove very nearly approaches the method prescribed by the ASTM Cloud Point (TXP) test method. The analyzing system described uses atmospheric conventional air cooling of the sample loop, returning of the bypass loop to the process stream, and reduction of the sample which must be drained as for example, to only 2 or 3 gallons per day.

I claim as my invention:

1. An apparatus for detecting the crystal point of a normally liquid composition having constituents which crystallize upon being cooled, comprising:
   a container adapted to contain a sample of said liquid composition up to a predetermined level, said container comprising a cup and an insulated jacket surrounding and spaced from said cup to form an annular space between the well of said cup and said jacket;
   a point source temperature measuring device disposed below said sample level of said container;
   sample cooling means operatively engaging said container for cooling said sample, said cooling means comprising a vortex tube disposed to discharge cooled air into said annular space;

sample inlet means coupled to said cup for introducing said sample therein;

sample drain means coupled to said cup for draining any sample within said cup;

first valve means disposed to control flow through said sample inlet means and second valve means disposed to control flow through said sample drain means whereby said cup may be drained and refilled with a new sample.

recording means for registering the change in temperature of said sample on a cooling curve, said recording means being coupled to said temperature measuring device;

differentiating means coupled to said temperature measuring means for detecting any changes in the slope of the cooling curve of said sample, zero point recording means coupled to said differentiating means for recording the point on said cooling curve when the slope thereof approaches zero and recycling means coupled to said zero point recording means for actuating said first and second valve means in timed sequence to refill said container with a new sample.

* * * * *